United States Patent [19]

Morita et al.

[11] 3,930,122

[45] Dec. 30, 1975

[54] OSCILLATOR SYNCHRONIZATION CIRCUIT IN A TELEVISION CAMERA

[75] Inventors: Akiyoshi Morita, Sagamihara; Tomotada Enami, Tokyo, both of Japan

[73] Assignee: Victor Company of Japan, Limited, Japan

[22] Filed: Mar. 28, 1974

[21] Appl. No.: 455,959

[30] Foreign Application Priority Data

Mar. 31, 1973 Japan................................ 48-37175

[52] U.S. Cl.. 178/69.5 TV; 178/7.35; 178/69.5 DC; 331/20; 331/172

[51] Int. Cl.²......................... H04L 7/00; H03B 3/04

[58] Field of Search.... 178/69.5 TV, 7.35, 69.5 DC; 179/15 BS; 331/20, 34, 172

[56] References Cited

UNITED STATES PATENTS

| | | | |
|---|---|---|---|
| 3,074,027 | 1/1963 | Rout | 178/69.5 TV |
| 3,609,220 | 9/1971 | Poel | 178/69.5 TV |

*Primary Examiner*—Malcolm A. Morrison
*Assistant Examiner*—Errol A. Krass
*Attorney, Agent, or Firm*—Holman & Stern

[57] ABSTRACT

An oscillator synchronization circuit in a television camera comprises a circuit for detecting incoming synchronizing signals from the outside, an oscillator capable of oscillating at a first frequency in the absence of the output from said detector circuit and oscillating in free-running at a second frequency sufficiently lower than said first frequency in response to the detector output, and trigger pulse shaping means for shaping trigger pulses from the external synchronizing signal and supplying the same to the oscillator. The oscillator performs free-running oscillation at the first frequency in the absence of an incoming external synchronizing signal and an output of the detector circuit and, in the presence of an external synchronizing signal, synchronizes with the external synchronizing signal and oscillates at the same frequency as that of the synchronizing signal, the free-running oscillation frequency being amply lowered by the output of the detector circuit, and, at the same time, the oscillator being triggered by the trigger pulse.

4 Claims, 5 Drawing Figures

OSCILLATOR SYNCHRONIZATION CIRCUIT IN A TELEVISION CAMERA

BACKGROUND OF THE INVENTION

This invention relates to a circuit in a television camera for the synchronization of an oscillator with outside signals and more particularly to an oscillator synchronization circuit capable of automatically switching an oscillator within a television camera during the image pick-up operation of the camera from a state of performing vertical deflection by the free-running oscillation output of the oscillator to a state of performing vertical deflection wherein the oscillator is synchronized with a reference synchronizing signal from the outside and caused to perform vertical deflection by the oscillator output. In the case where an image is picked up by a single television camera, in general, there arises no problem if scanning, or so-called "random interlace", is performed by the free-running oscillation output of an oscillator incorporated in the television camera device. No external synchronizing signal is required in this case.

In cases where pickup is carried out by a plurality of television cameras, ad one of their outputs is obtained by switching operation or where recording or reproducing operation of a recording and reproducing apparatus such as a video tape recorder is carried out in combination with the pickup operation of a television camera or cameras, there arises the need for synchronization for the scanning operation of such a television camera or cameras with a synchronizing signal fed to the camera from the outside.

It is seen here that, as to horizontal deflection, synchronization with an external synchronizing signal can easily be achieved by merely feeding the external synchronizing signal to a horizontal AFC circuit in the camera device. As to vertical deflection, however, a circuit for applying trigger pulses derived from the external synchronizing signal to an oscillator for vertical deflection such as a multivibrator in the camera device has been used in order to achieve synchronization.

It has been necessary for the external signal synchronizing circuit used in a conventional camera of this kind, as will be hereinafter described, to maintain the free-running oscillation frequency of the multivibrator extremely stable at a predetermined frequency. It has been found to be extremely difficult and expensive to produce a multivibrator to meet this requirement. Another drawback of such a multivibrator is the need for manual switching operation in switching one time constant of the multivibrator to another for synchronization with the external synchronizing signal as will be detailed hereinafter.

Still another drawback of such a multivibrator is that a switching operation is needed each time synchronization is effected with the external synchronizing signal, which is extermely troublesome for the television camera operator with the possibility of erroneous operation arising from the switching operation.

SUMMARY OF THE INVENTION

Accordingly, it is a general object of the present invention to provide a novel and useful circuit for synchronizing with an external signals in which the above described disadvantages of the prior art are removed.

A specific object of the present invention is to provide a circuit for synchronizing with an external signal for incorporation in a television camera while is capable of automatic synchronization with an external synchronizing signal without the necessity of resorting to manual switching operation.

By this provision according to this invention, automatic synchronization is achieved by the mere application of an external synchronizing signal, with the result that switching operation as required for similar conventional circuits can be dispensed with.

It is another object of the present invention to provide a circuit for synchronizing with an external synchronizing signal so adapted that an oscillator in a television camera device initiates free-running oscillation in the absence of an incoming external synchronizing signal to cause a vertical deflection circuit to be operated by the free-running oscillation output, and in the case where an external synchronizing signal arrives, the oscillator carries out oscillation by being automatically locked to the external synchronizing signal, the vertical deflection circuit being operated in a state of synchronism with the external synchronizing signal by the output of the oscillator.

These and other objects and further features of the present invention will be apparent from a consideration of the following detailed description taken in conjunction with the accompanying drawings.

DETAILED DESCRIPTION

Figure 1:
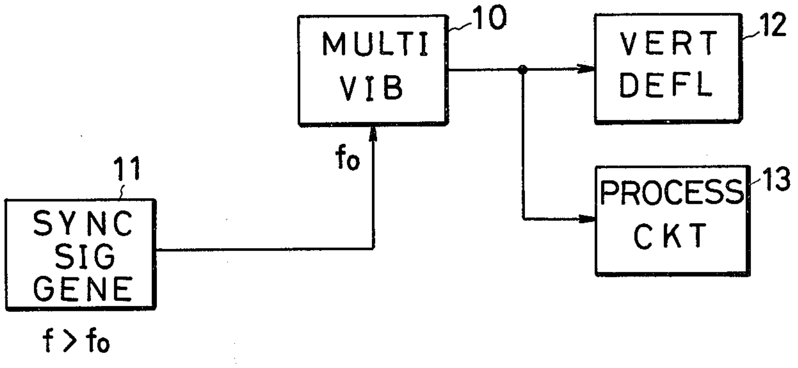
FIG. 1 PRIOR ART
FIGS. 1 and 2 are respectively block diagrams of examples of circuits for synchronizing with external signals in a conventional television camera.
Figure 2:
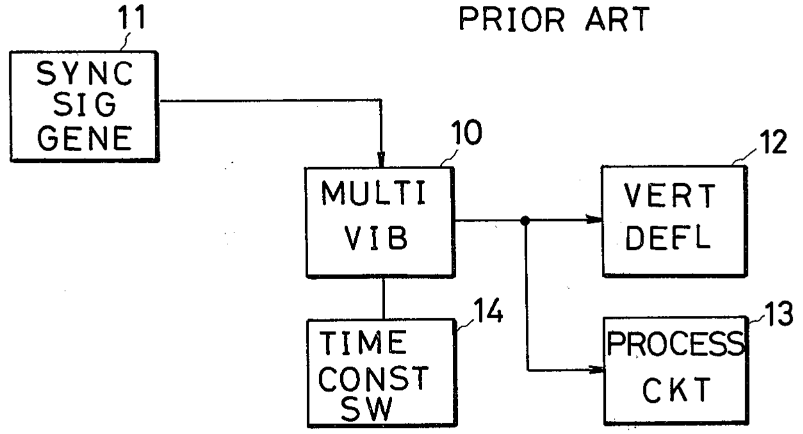

As conducive to a full understanding of the nature of the present invention, two examples of known circuits for synchronizing with external signals will first be considered briefly with reference to FIGS. 1 and 2.

Referring to the example shown in FIG. 1, it is seen that a multivibrator 10 undergoes free-running oscillation at a frequency $fo$, and its output rectangular waveform signal is fed to both a vertical deflection circuit 12 and a processing circuit 13. In order for the oscillation of this multivibrator to be synchronized with an external synchronizing signal, trigger pulses obtained from pulses with a period T ($1/f$), which is somewhat shorter than the period $1/fo$ (T$o$) of the free-running oscillation produced by an external synchronizing signal generator 11, is fed to the multivibrator 10. Then the oscillation frequency of the multivibrator 10 becomes $f$, and a rectangular wave of the frequency $f$ is fed to the vertical deflection circuit 12 and the processing circuit 13.

In the above-mentioned circuit arrangement, it is necessary merely to apply the external synchronizing signal to the multivibrator 10 in order to achieve synchronism with the external synchronizing signal, and, hence, switching operation for circuit constants can be dispensed with.

However, it is necessary to maintain the free-running oscillation frequency *fo* of the multivibrator 10 as a stable frequency lower than the frequency *f* of the external synchronizing signal. Accordingly, the conventional circuit shown in FIG. 1 has a disadvantage in that it is considerably difficult in practice to stably maintain the free-running oscillation frequency at the above described frequency value.

Referring to FIG. 2 illustrating another example of a conventional circuit, a detailed description of the circuit operation is herein omitted for the sake of simplicity, and like reference numerals or symbols are used to designate parts which are the same as corresponding parts in FIG. 1. The circuit of this example is designed to switch over one oscillation frequency of the multivibrator 10 to another by means of a time-constant switching circuit 14 when the multivibrator 10 is synchronized with an external synchronizing signal.

The multivibrator 10 normally furnishes a free-running oscillation output with the period T*o* (1/*fo*) to the vertical-deflection circuit 12 and the processing circuit 13. In effecting synchronism with an external signal, the time constant of the multivibrator 10 is switched to another by the time-constant switching circuit 14, thereby switching one oscillation period to another and causing a signal of an oscillation period T1 to oscillate.

It will be understood that the circuit constants of the time-constant circuit have been preset so that the period T1 becomes sufficiently larger than the period T*o* and that a trigger pulse formed by the external synchronizing signal of a period T delivered from the external synchronizing signal generator 11 is applied to the multivibrator 10 simultaneously with the operation of the time-constant switching circuit 14. This causes the oscillation period of the multivibrator 10 to be kept locked to the period T of the external synchronizing signal so that it carries out oscillation with the period T. Although the period T of the external synchronizing signal may be selected equal to the free-running oscillation period T*o*, the periods T must be shorter than the period T1.

The above mentioned time-constant switching circuit 14 comprises, for example, resistors, changeover switches, etc., and manual switching operation is required each time when the multivibrator is and is not synchronized with the external syncrhonizing signal.

Accordingly, these conventional synchronizing circuits for external synchronizing signals have had the drawbacks of the switching operation tending to become troublesome and of erroneous operation being liable to occur.

Therefore, it is contemplated in the present invention to overcome these disadvantages of the conventional circuit designs.

Some embodiments of this invention will now be described in conjunction with the accompanying drawings.

Figure 3:
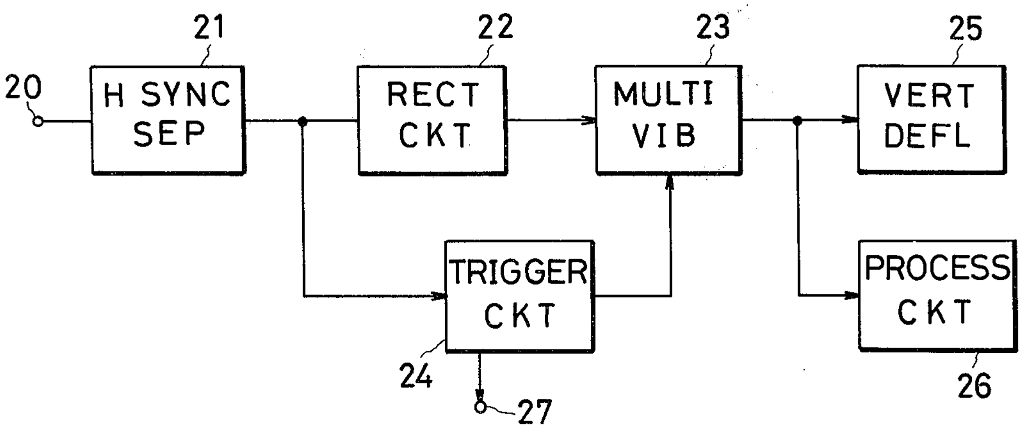
FIG. 3 is a block diagram of an embodiment of a circuit for synchronizing with an external signal of this invention for use in a television camera.

FIG. 3 is a block diagram of an embodiment of a circuit for automatic synchronizing with an external signal in a television camera according to this invention.

Figure 5:
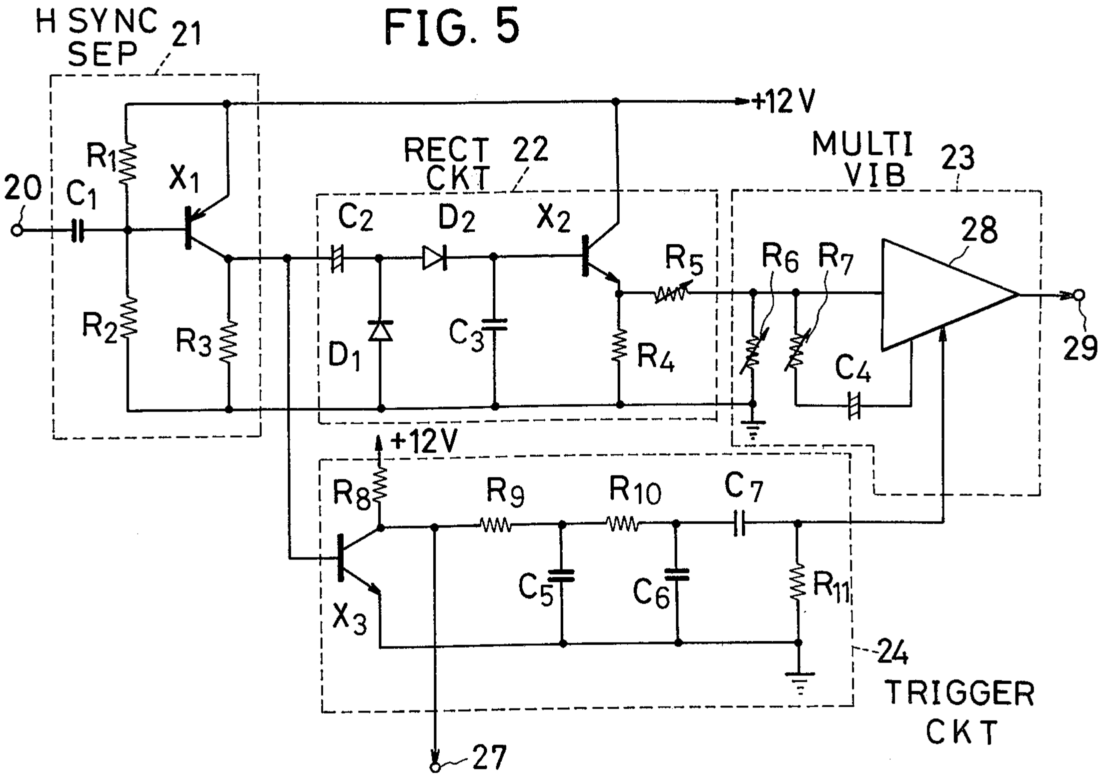
FIG. 5 is a circuit diagram for a more specific representation of the block diagram shown in FIG. 3.

FIG. 5 is a circuit diagram showing an embodiment of a specific circuit for an essential part of the circuit arrangement shown by the block diagram shown in FIG. 3.

The same numerals or symbols as used in FIG. 5 are also used to identify like blocks in FIG. 3.

An output signal from an external synchronizing signal oscillator, a composite synchronizing signal of a vertical synchronizing signal, and a horizontal synchronizing signal, or a video signal (hereinafter referred to as an external synchronizing signal) is fed through an external synchronizing signal input terminal 20 to a horizontal synchronizing separator circuit 21 consisting of a transistor X1, resistors R1, R2, R3, and a capacitor C1. The separated horizontal synchronizing signal is applied to a horizontal synchronizing rectifier circuit 22 and a trigger circuit 24.

The horizontal synchronizing signal fed to the rectifier circuit 22 undergoes double-voltage rectification by capacitors C2 and C3 and diodes D1 and D2 and impedance transformation by an emitter follower consisting of a transistor X2 and a resistor R4, and is thereafter supplied to a multivibrator 23 through a variable resistor R5.

The multivibrator 23 comprises a main integrated circuit portion 28, variable resistors R6 and R7, and a capacitor C4. The free-running oscillation frequency is controlled by a variable resistor R6, and the output pulse width is controlled by a variable resistor R7 and a capacitor C4.

On the other hand, the horizontal synchronizing signal fed to a trigger circuit 24 is delivered partly to a horizontal AFC circuit (not illustrated) through a terminal 27 and partly to a circuit consisting of resistors R9 and R10 and a capacitor C6 for integration and for subsequent differentiation by a circuit comprising a capacitor C7 and a resistor R11. The output differentiated pulse is fed to the main circuit portion 28 in IC form in the multivibrator 23 as a trigger pulse. The output of the multivibrator 23 is fed through a terminal 29 to a vertical-deflection circuit 25 and a processing circuit 26.

Figure 4:
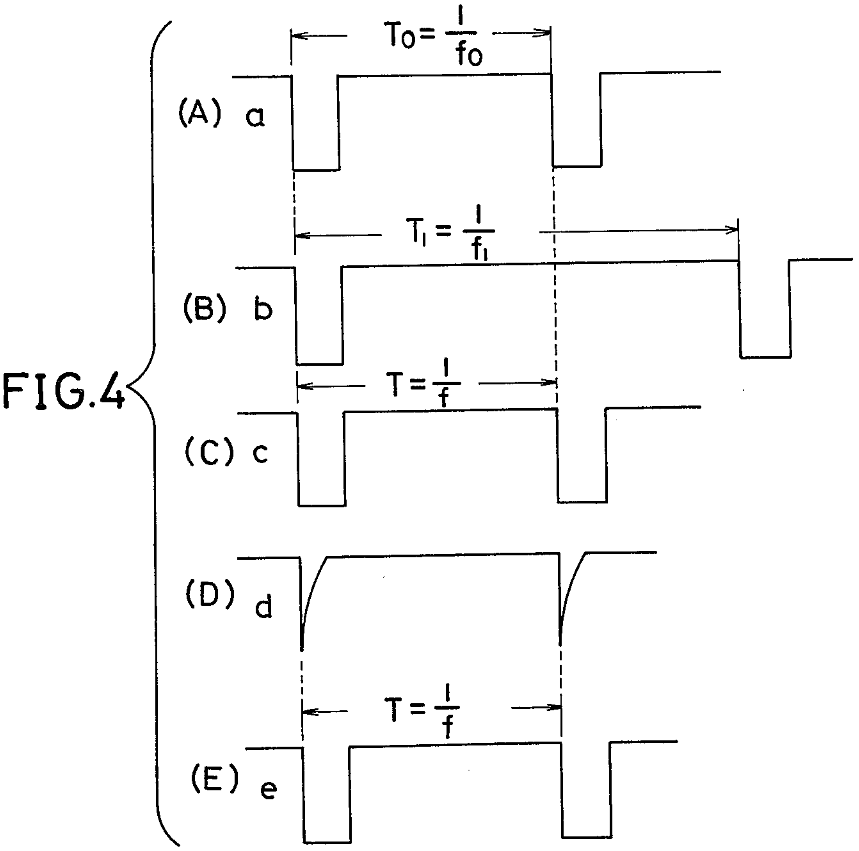
FIGS. 4(A) through 4(E) are respectively signal waveform time charts for a description of the operation of the circuit shown in block diagram illustrated in FIG. 3.

In the absence of an external synchronizing signal applied to the input terminal 20 in the above described circuit arrangement, the multivibrator 23 undergoes free-running oscillation and the oscillation output *a* of frequency *fo* and period T*o* (1/*fo*) as shown in FIG. 4(A) is fed to the vertical-deflection circuit 25 and the processing circuit 26.

For synchronization with an external signal, the signal is applied to the input terminal 20. A horizontal synchronizing signal *c* of a frequency *f* and period T (1/*f*) as shown at FIG. 4(c) is separated from the external synchronizing signal. The horizontal synchronizing signal is, after rectification by a rectifier circuit 22, applied to a variable resistor R6. The rectified DC voltage serves as a bias for the multivibrator 23, and the free-running oscillation frequency of the multivibrator 23 is lowered by the application of the bias voltage, producing, as it is, the oscillation output *b* of frequency *fl* and period T1 (1/*fl*) as shown in FIG. 4(B). The frequency *fl* is of the order of 5 Hz or less, for example, assuming that the frequency *f* is 60 Hz.

The separated horizontal synchronizing signal *c*, however, is also fed to the trigger circuit 24 at the same time to be shaped into a trigger pulse *d* at a period T, (1/*f*) as shown at FIG. 4(D). The trigger pulse *d* is also applied to the multivibrator 23.

As a result, the multivibrator 23 produces an oscillation output signal *e* of a frequency *f* and a period T (1/*f*) as shown in FIG. 4(E) which is locked to the trigger pulse *d*. In the synchronization with an external synchronizing signal through the use of the circuit according to this invention, it is only necessary to apply the external synchronizing signal to the circuit, and, hence, the synchronization can be attained automatically with the external synchronizing signal without a switching operation using manual changeover switches, etc.

Although the synchronizing separator circuit 21 is intended to separate a horizontal synchronizing signal, it may be designed to separate a vertical synchronizing signal. However, since the horizontal synchronizing signal is of higher frequency than the vertical synchronizing signal, the subsequent rectification is easier, and more accurate detection of external synchronizing signals is possible.

While means are provided in the foregoing embodiments for carrying out the detection of an external synchronizing signal by the horizontal synchronizing separator circuit 21 and the rectifier circuit 22 and for lowering the free-running oscillation frequency of the multivibrator by varying its bias voltage with the detected output, the principles of this invention are by no means restricted thereto, and any other suitable means may be adapted for the circuit arrangement provided that the arrangement is adapted to detect an incoming external synchronizing signal, and the free-running oscillation frequency of an oscillator is decreased by the detected output.

Further, this invention is not limited to these embodiments but various variations and modifications may be made without departing from the scope and spirit of the invention.

What is claimed is:

1. An oscillator synchronization circuit in a television camera, said circuit comprising an oscillator for producing free-running oscillation at a predetermined frequency *fo;* a rectifier circuit for rectifying an externally supplied synchronizing signal of a frequency *f* which originates external to the circuit and for feeding its rectified output to said oscillator thereby to cause the oscillator to produce free-running oscillation at a frequency *fl* which is lower than said frequency *fo;* a trigger circuit for forming a trigger pulse at a frequency *f* from the externally supplied synchronizing signal and for feeding said trigger pulse to said oscillator thereby to cause said oscillator to produce oscillation at a frequency *f;* and a circuit driven in synchronism with and by said output of said oscillator, said driven circuit being driven by the free-running output of said oscillator in the absence of said externally supplied synchronizing signal and driven in synchronism with said externally supplied synchronizing signal by the output of said oscillator when said externally supplied synchronizing signal exists.

2. An oscillator synchronization circuit in a television camera, said circuit comprising: an oscillator for producing a free-running oscillation output at a first predetermined frequency; a detecting circuit for detecting the presence of a synchronizing signal originating external to the circuit and for producing an output which is supplied to said oscillator to thereby cause the oscillator to produce free-running oscillations at a second predetermined frequency which is lower than said first predetermined frequency; and a trigger circuit for forming a trigger pulse from said synchronizing signal, the frequency of said trigger pulse being the same as the frequency of said synchronizing signal, said trigger circuit supplying the trigger pulse to said oscillator to thereby cause said oscillator to produce an oscillation output of the same frequency as said synchronizing signal, said oscillator producing said free-running oscillation output at the first predetermined frequency in the absence of said synchronizing signal and producing said oscillation outut of the same frequency as said synchronizing signal in the presence of said synchronizing signal.

3. An oscillator synchronization circuit according to claim 2 wherein said detecting circuit comprises a circuit for rectifying said synchronizing signal, and wherein said oscillator is supplied with a rectified DC output voltage from said rectifier circuit as a bias whereby the frequency of said free-running oscillation output is lowered to said second predetermined frequency.

4. An oscillator synchronization circuit according to claim 2 wherein said detecting circuit comprises a circuit for separating a horizontal synchronizing signal from said externally originating synchronizing signal and a circuit for rectifying said horizontal synchronizing signal separated by said separator circuit and for supplying the resulting output DC voltage as a bias to said oscillator.

* * * * *